United States Patent
Epp et al.

(10) Patent No.: US 6,439,436 B2
(45) Date of Patent: Aug. 27, 2002

(54) STORAGE BIN FOR PARTICULATE MATERIALS

(76) Inventors: Richard J. Epp, Box 64, Fiske, Saskatchewan (CA), S0L 1C0; Dwayne S. Epp, Box 64, Fiske, Saskatchewan (CA), S0L 1C0

( * ) Notice: Subject to any disclaimer, the term of this patent is extended or adjusted under 35 U.S.C. 154(b) by 0 days.

(21) Appl. No.: 09/779,057

(22) Filed: Jan. 29, 2001

Related U.S. Application Data

(62) Division of application No. 09/330,976, filed on Jun. 14, 1999, now Pat. No. 6,237,813.

(51) Int. Cl.[7] ............................................. B67D 5/06
(52) U.S. Cl. .................... 222/185.1; 222/626; 222/342; 222/352; 222/413; 222/415
(58) Field of Search ............................ 222/185.1, 342, 222/352, 371, 413, 415, 626

(56) References Cited

U.S. PATENT DOCUMENTS

| | | | | |
|---|---|---|---|---|
| 3,260,414 A | * | 7/1966 | Mora | 222/626 |
| 3,334,760 A | | 8/1967 | Bolinger et al. | 222/413 |
| 4,416,547 A | * | 11/1983 | Mikolajczyk | 222/415 |
| 4,922,463 A | * | 5/1990 | Del Zotto et al. | 222/415 |
| 5,242,667 A | * | 9/1993 | Koziol et al. | 222/342 |
| 5,575,406 A | | 11/1996 | Buchfink | 222/195 |
| 5,709,322 A | | 1/1998 | Ricciardi | 222/413 |

FOREIGN PATENT DOCUMENTS

| | | | | |
|---|---|---|---|---|
| SU | 1162930 | 6/1985 | | 222/195 |
| SU | 1253890 | 2/1988 | | 222/195 |

* cited by examiner

Primary Examiner—Joseph A. Kaufman
(74) Attorney, Agent, or Firm—Adrian D. Battison; Michael R. Williams; Ryan W. Dupuis

(57) ABSTRACT

A grain storage bin has a circular bin floor structure and a cylindrical bin wall upstanding from the floor. A bin aeration system includes a perforated air discharge tube mounted diametrically across the bin supported on a frame above the floor from one side with an air supply duct for supplying air from a fan through the wall. The floor structure is divided diametrically into two separate half sections. A rectangular discharge duct extends from a feed opening at a center of the bin horizontally under the horizontal support surface to a discharge outside the wall of the bin with a belt having parallel runs along the duct, a first opening at the center of the bin and a second opening adjacent the wall so that the material within the bin can fall onto the upper run of the belt to be carried to the side for discharge.

9 Claims, 5 Drawing Sheets

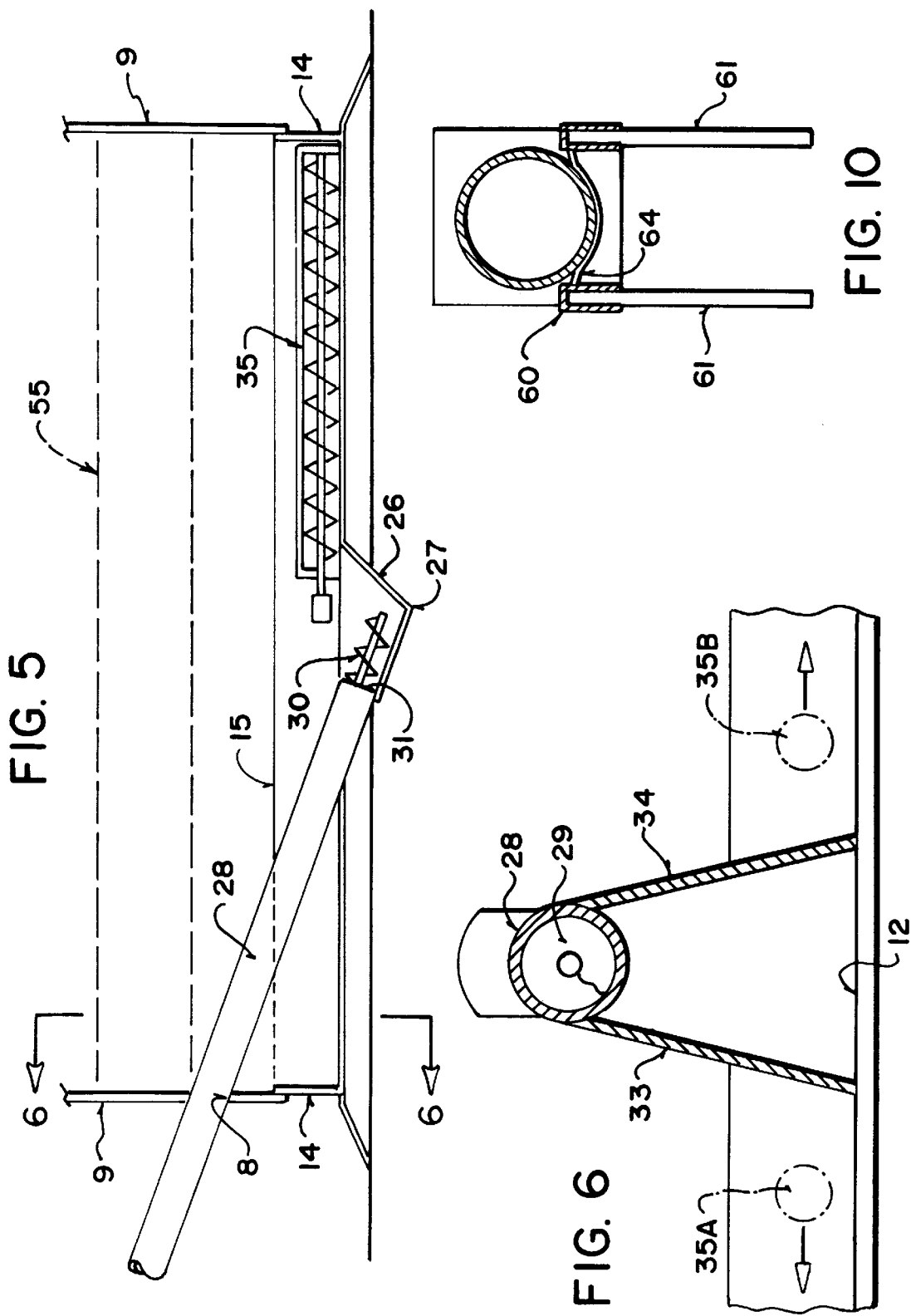

STORAGE BIN FOR PARTICULATE MATERIALS

This application is a divisional of application Ser. No. 09/330,976 filed Jun. 14, 1999 and now issued as U.S. Pat. No. 6,237,813.

FIELD OF THE INVENTION

This invention relates to a storage bin of the type comprising a horizontal circular base with a cylindrical peripheral wall upstanding from the base which is generally used for storing particulate materials such as grain and other crops.

BACKGROUND

Many such bins are formed by a concrete base with the peripheral wall formed from corrugated panels bolted to and standing upwardly from the edge of the concrete base.

SUMMARY

It is one object of the present invention to provide an improved discharge system for a bin of this general type.

According to an aspect of the present invention there is provided a storage bin comprising:

a bin floor structure having a circular horizontal support surface;

a cylindrical bin wall upstanding from the support surface;

and a bin discharge system for discharging material stored in the bin from the bin to a position exteriorly of the bin, the discharge system comprising:

a discharge duct having a material transport member within the duct for transporting the material along the duct;

the duct extending from a feed opening at a center of the bin horizontally under the horizontal support surface to a discharge outside the wall of the bin;

the material transport member comprising a belt having an upper run along the duct.

Preferably the duct is rectangular so as to receive the upper and lower runs of the belt across the width of the duct.

Preferably the duct has a first slide gate at the center of the bin and the second slide gate approximately midway between the center of the bin and the side wall of the bin.

Preferably the belt is mounted on a belt conveyor system which allows the belt to be removed from the duct to an opening at the end of the duct at the edge of the floor structure.

Preferably the belt includes an elevator section at an end thereof outside the bin for discharging the material from the bin into a main conveyor.

Preferably the storage bin includes a bin sweep.

BRIEF DESCRIPTION OF THE DRAWINGS

In the accompanying drawings, which illustrate an exemplary embodiment of the present invention:

FIG. 5 is a cross sectional view along the lines 5—5 of FIG. 4.

FIG. 6 is a cross sectional view along the lines 6—6 of FIG. 5.

FIG. 10 is a cross sectional view along the lines 10—10 of FIG. 9.

DETAILED DESCRIPTION

Figure 1:
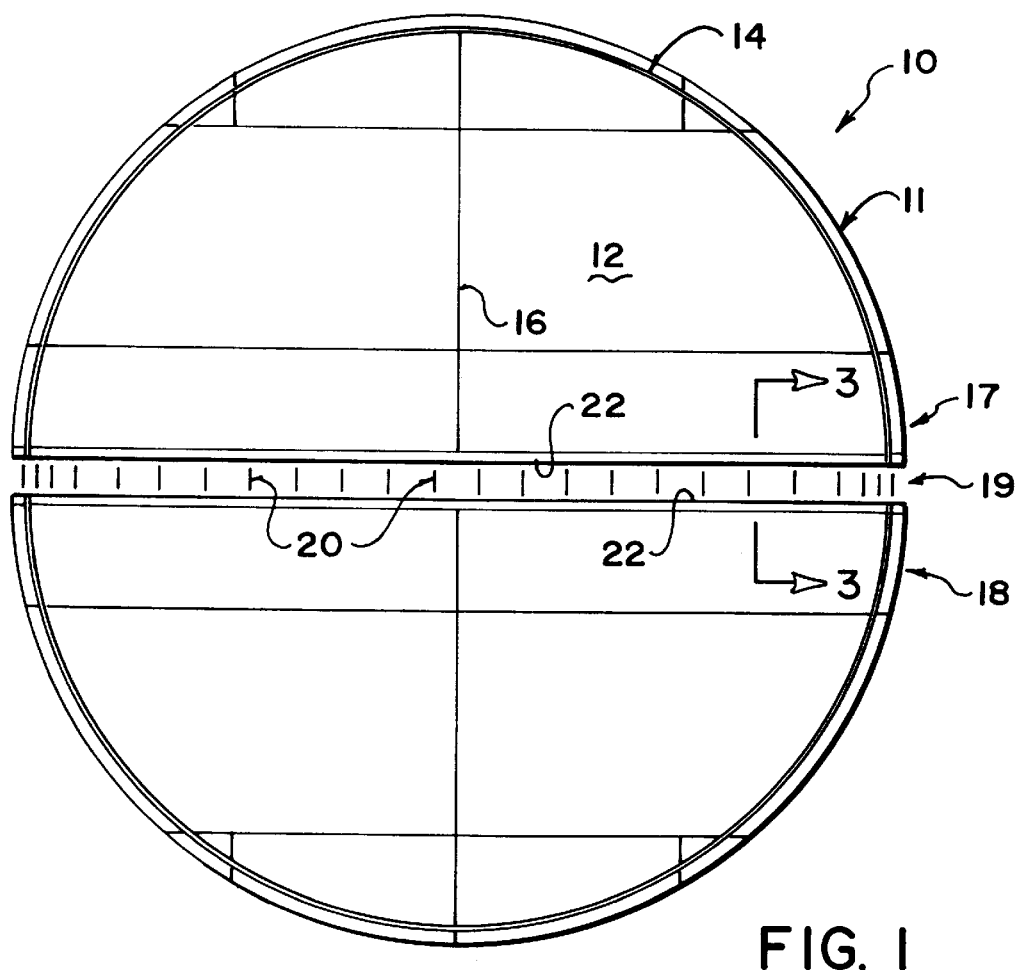
FIG. 1 is a top plan view of a floor structure for a storage bin according to the present invention.
Figure 2:
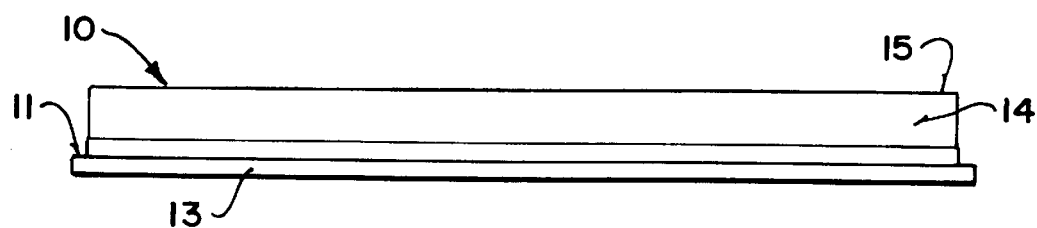
FIG. 2 is a side elevational view of the floor structure of FIG. 1.

A storage bin comprises a floor structure 10 to which is attached a conventional cylindrical wall and a roof structure (not shown). The floor structure is formed from sheet metal panels which are welded together to form a circular base 11 defining a horizontal circular upper surface 12. At the outside edge of the horizontal wall 11 is defined a turned down edge flange 13. Spaced slightly inwardly from the outer edge at the flange 13 is provided an upstanding side wall portion 14 which extends upwardly to a top edge 15 to which the side wall of the bin is attached by bolting in conventional manner.

The horizontal circular plate 11 defining the surface 12 is formed from a plurality of panels joined at edges 16.

Figure 3:
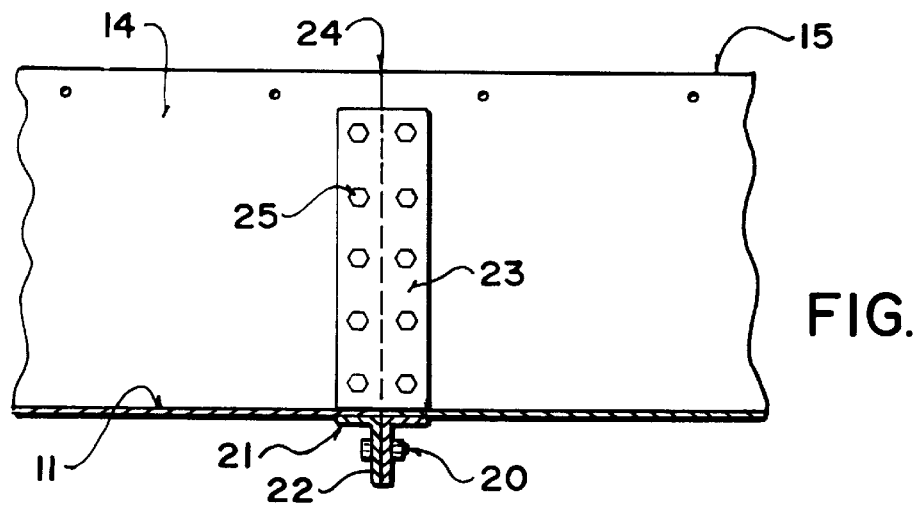
FIG. 3 is a cross sectional view along the lines 3—3 of FIG. 1.

The floor structure is divided into two sections 17 and 18 separated at a divide 19. In FIG. 3 the two sections are shown bolted together and in FIG. 1 they are shown separated and ready to be bolted together by bolts 20.

The two sections are joined together by a pair of angle iron members 21 and 22 each of which is attached to one section of the horizontal support wall 11 at the edge 22 thereof. Thus each angle iron member includes a horizontal flange welded to the edge 22 and a vertical flange extending downwardly from the horizontal wall 11 so that the two vertical flanges can be brought together and bolted together by the bolts 20. An end plate 23 bridges the junction 24 between the edges of the side wall 14 and is attached to both edges by bolts 25.

Thus floor structure can be divided into two sections by removing the bolts and thus can be readily transported from place to place for installation at a new site.

Figure 4:
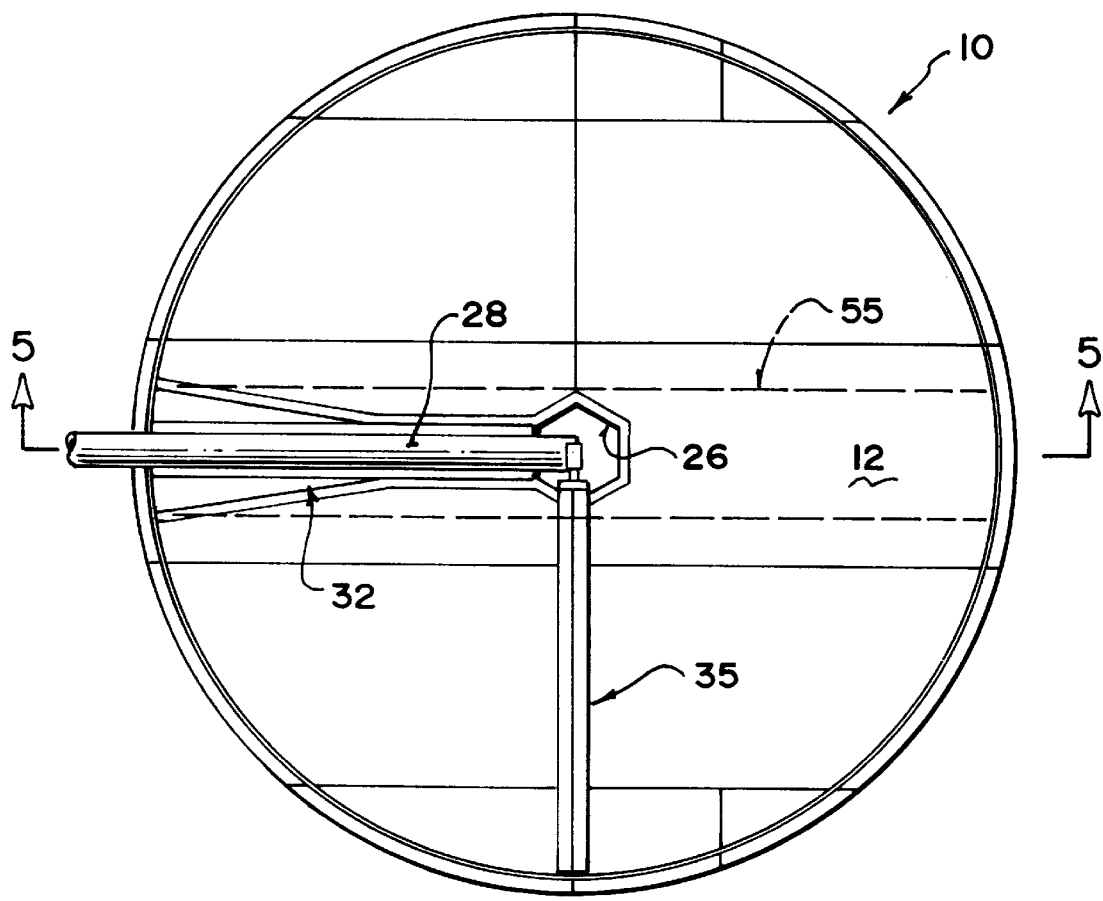
FIG. 4 is a top plan view of the bin floor of FIG. 1 modified to include a material discharge system.

Turning now to FIGS. 4, 5 and 6, there is shown the same floor structure generally indicated at 10 and the bin wall 9. In this arrangement the floor structure is modified by the addition of a recessed section 26 in the floor arranged at the center. The recessed section is generally hexagonal in shape at the surface 12 and converges to an apex 27 at the bottom. One side of the hexagonal shape receives a cylindrical tube 28 of an auger discharge system including an auger flight 29 contained within the tube. A feed section 30 of the auger flight projects beyond a lowermost end 31 of the tube 28 so as to project into the recess 26.

The duct 28 is inclined upwardly and outwardly so as to exit through the wall 9 at an opening 8 raised upwardly above the base surface 11 and upwardly of the top edge 15.

Underneath the duct 28 is provided a base structure 32 comprising a pair of side walls 33 and 34 which extend downwardly from a respective side of the duct 28 to the surface 12. Thus each side wall is generally triangular and extends from a vertical edge at the side wall 9. Each side wall has a top edge welded to and lying along the side of the tube or duct and a third edge extending along the surface 12. The side wall converges to an apex at the point where the duct passes through the surface 12 into the recess 26.

The side walls 33 and 34 are inclined downwardly and outwardly relative to a central vertical plane of the duct so as to form in effect a "pyramid" shape thus tending to shed material away from the duct and outwardly onto the floor so that the material can be carried by a bin sweep 35 of conventional construction to the recess 26. Thus the bin sweep can move position 35A at the side wall 13 around the bin to a position 35B at the side wall 34 by moving through an angle slightly less than 360° and thus sweep in effect the whole of the floor without leaving any material underneath the duct 28.

Figure 7:
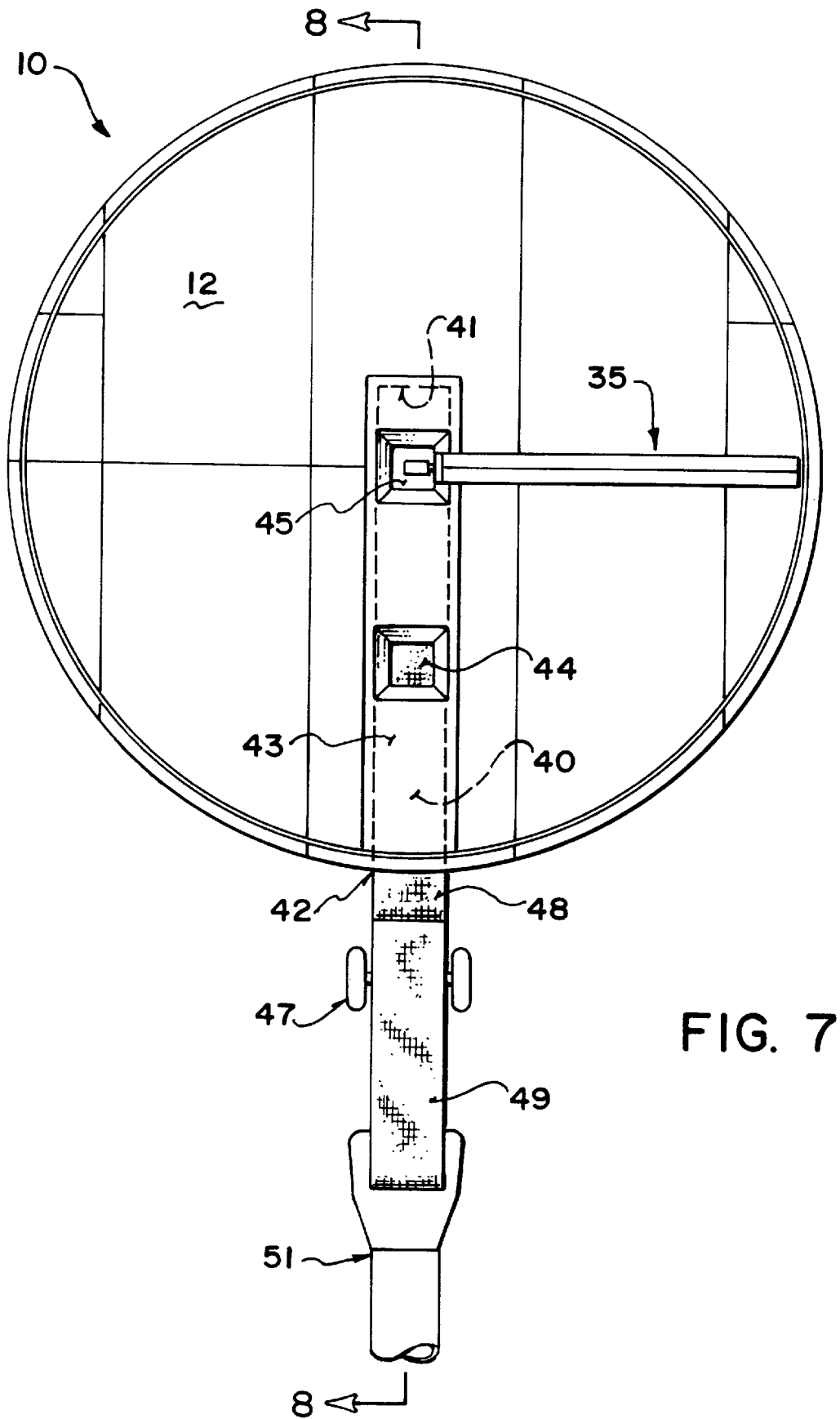
FIG. 7 is a top plan view of the floor structure of FIG. 1 showing a further modified arrangement for discharging material.
Figure 8:
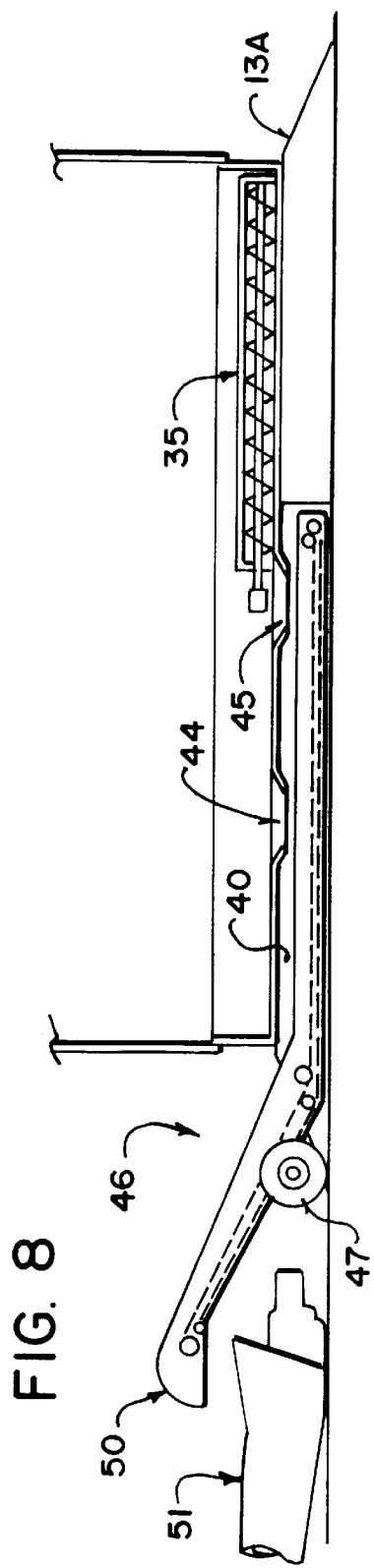
FIG. 8 is a cross sectional view along the lines 8—8 of FIG. 7.

Turning now to FIGS. 7 and 8 there is shown a modified discharge arrangement for use with the floor structure 10. In this arrangement, the floor is formed with a rectangular trough 40 underneath the floor and extending along a diameter of the floor structure from an end 41 just beyond the center outwardly to a side edge at an opening 42 in the base of the floor structure. The trough is covered by a top wall 43 which fully covers the trough apart from two openings 44 and 45 each of which is covered by a slide gate operable from the end 42.

The bin sweep 35 is arranged to rotate around the full surface 12 since it can pass over the top surface 43 at the trough 40.

A belt conveyor arrangement 46 is provided mounted on a frame and ground wheels 47 by which it can be moved from bin to bin. The belt conveyor arrangement comprises a frame carrying a belt having an upper run and a lower run on elongate track arrangement which can be inserted into the trough 40. Thus an upper run 48 of the belt is located directly underneath the trough and can receive material from one or both of the openings 44 and 45. The belt conveyor further includes an elevator section 49 carrying the material to a discharge 50 for discharge into a conventional main conveyor arrangement 51.

This arrangement is located wholly under the floor of the bin structure and thus requires a raised base of the floor structure with an inclined outer flange 13A replacing the vertical flange 13. The height of the flange 13A is increased so a to provide sufficient room for the trough 40.

The arrangement is particularly suitable for materials which can be damaged by an auger flighting such as peas and the like.

Figure 9:
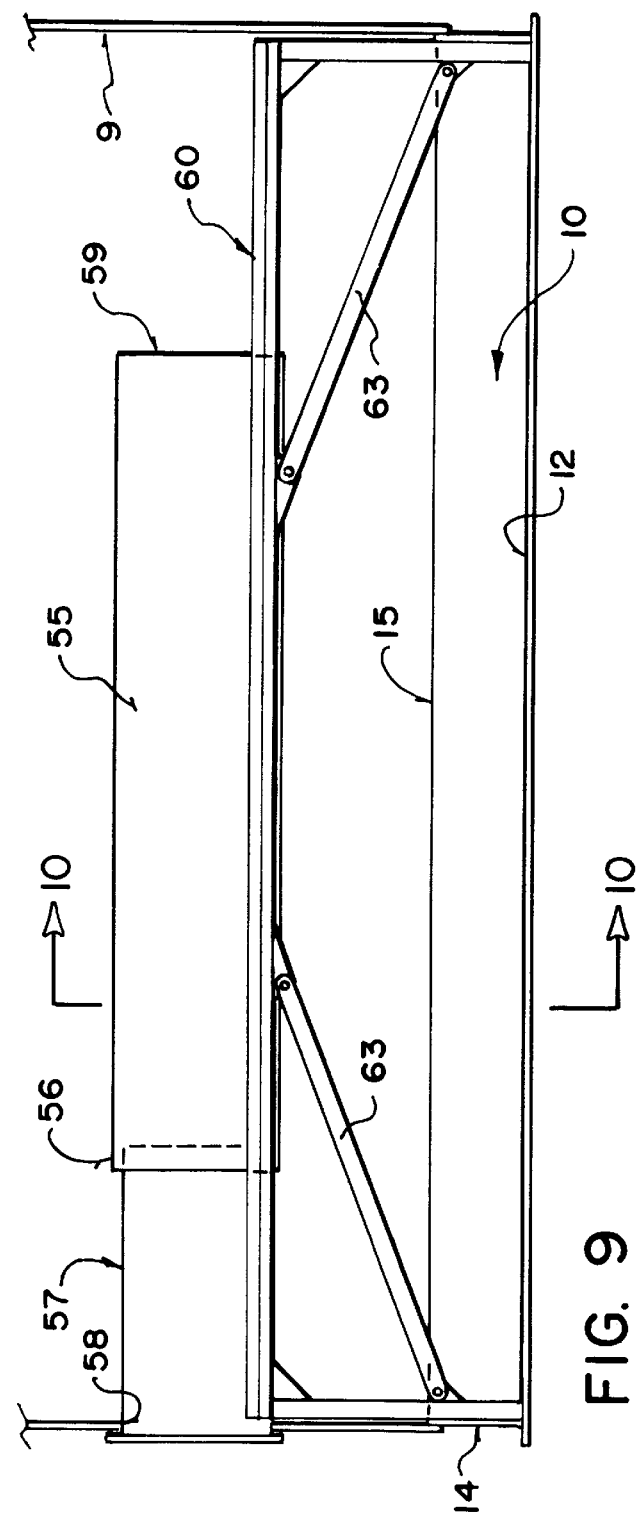
FIG. 9 is a vertical cross sectional view through the bin structure according to the present invention including an aeration system.

Turning now to FIGS. 9 and 10, there is shown an aeration system for use with the bin floor structure 10 and the wall 9. The aeration system comprises a length of perforated tube 55 which is connected at one end 56 to an imperforate or solid air tube 57 which extends from an opening 58 in the wall 9. The tube 55 has a second end 59 which is spaced substantially equal distantly relative to end 56 from the wall so that the tube sits along a diameter of the bin floor structure. The solid air tube 57 is connected to a fan outside the bin wall. The ducting included in the perforated air tube and the solid air tube are supported on a frame structure so they are carried away from the surface 12 and above the edge 15. The ducts are carried on a pair of side rails supported on vertical legs 61 so that each side rail is arranged on its respective side of the tube and each side is relatively directly attached to the top end of a respective one of the legs. The legs are arranged at the wall 9 and thus at the wall 14. The structure is braced by inclined angle braces 63. The rails are connected to the outside of the tube by transverse straps 64 which span the rails and wrap around the bottom part of the tube 55.

The tube is thus supported away from the bin floor and provides air flow at a height of the order of three feet from the bin floor so that the majority of the air is supplied in the required location substantially directly in the center of the bin.

While one embodiment of the present invention has been described in the foregoing, it is to be understood that other embodiments are possible within the scope of the invention. The invention is to be considered limited solely by the scope of the appended claims.

What is claimed is:

1. A storage bin for particulate material comprising:
 a bin floor structure having a circular horizontal fixed support surface;
 a cylindrical bin wall upstanding from an outer edge of the support surface;
 and a bin discharge system for discharging material stored in the bin from the bin to a position exteriorly of the bin, the discharge system comprising:
 a discharge trough below the horizontal fixed support;
 the trough being covered by a cover wall at the horizontal support surface with the cover wall defining a feed opening therethrough from the bin into the trough so that the trough extends from the feed opening at a center of the bin horizontally under the horizontal support surface substantially radially of the support surface to a discharge outside the wall of the bin with the support surface on either side of the trough for supporting the particulate material within the bin;
 a material transport conveyor within the trough for transporting the material along the trough from the feed opening in the cover wall at the center of the bin to the discharge;
 the material transport conveyor comprising a belt having an upper run and a lower run within the trough;
 the upper run having one end located under the feed opening to receive the particulate material in the bin falling through the feed opening onto the upper run;
 and the upper run extending from the feed opening to the discharge.

2. The storage bin according to claim 1 wherein the trough is rectangular so as to receive the upper and lower runs of the belt across the width of the trough.

3. The storage bin according to claim 1 including a bin sweep.

4. A storage bin for particulate material comprising:
 a bin floor structure having a cylindrical horizontal fixed support surface;
 a cylindrical bin wall upstanding from an outer edge of the support surface;
 and a bin discharge system for discharging material stored in the bin from the bin to a position exteriorly of the bin, the discharge system comprising:
 a discharge trough below the horizontal fixed support surface;
 the trough being covered by a cover wall at the horizontal support surface with the cover wall defining a first feed opening therethrough from the bin into the trough so that the trough extends from the first feed opening at a center of the bin horizontally below the horizontal support surface substantially radially of the support surface to a discharge outside the wall of the bin with the support surface on either side of the trough for supporting the particulate material within the bin;

a material transport conveyor within the trough for transporting the material along the trough from the first feed opening at the center of the bin to the discharge;

the material transport conveyor comprising a belt having an upper run and a lower run within the trough;

the upper run having on end located under the first feed opening to receive the particulate material in the bin falling through the first feed opening onto the upper run;

and the upper run extending from the first feed opening to the discharge;

wherein the cover wall has a second feed opening approximately midway between the center of the bin and the side wall of the bin; and wherein the cover wall of the trough has a first slide gate at the first feed opening at the center of the bin and a second slide gate at the second feed opening approximately midway between the center of the bin and the side wall of the bin.

5. The storage bin according to claim 4 including a bin sweep.

6. The storage bin according to claim 4 wherein the trough is rectangular so as to receive the upper and lower runs of the belt across the width of the duct.

7. A storage bin for particulate material comprising:

a bin floor structure having a cylindrical horizontal fixed support surface;

a cylindrical bin wall upstanding from an outer edge of the support surface;

and a bin discharge system for discharging material stored in the bin from the bin to a position exteriorly of the bin, the discharge system comprising:

a discharge trough below the horizontal fixed support surface;

the trough being covered by a cover wall at the horizontal support surface with the cover wall defining a first feed opening therethrough from the bin into the trough so that the trough extends from the first feed opening at a center of the bin horizontally below the horizontal support surface substantially radially of the support surface to a discharge outside the wall of the bin with the support surface on either side of the trough for supporting the particulate material within the bin;

a material transport conveyor within the trough for transporting the material along the trough from the first feed opening at the center of the bin to the discharge;

the material transport conveyor comprising a belt having an upper run and a lower run within the trough;

the upper run having on end located under the first feed opening to receive the particulate material in the bin falling through the first feed opening onto the upper run;

and the upper run extending from the first feed opening to the discharge;

wherein the conveyor includes a horizontal trough section of the belt arranged to be inserted in the trough and an inclined elevator section of the belt at an end of the trough section outside the bin for discharging the material from the bin into a main conveyor; and wherein the conveyor including horizontal trough section and the inclined elevator section is mounted on a belt conveyor mover system which allows the horizontal through an opening at the end of the trough at the edge of the floor structure.

8. The storage bin according to claim 7 including a bin sweep.

9. The storage bin according to claim 7 wherein the trough is rectangular so as to receive the upper and lower runs of the belt across the width of the duct.

* * * * *